No. 869,320. PATENTED OCT. 29, 1907.
C. F. MERRILL.
WATER METER.
APPLICATION FILED MAR. 18, 1907.
3 SHEETS—SHEET 1.
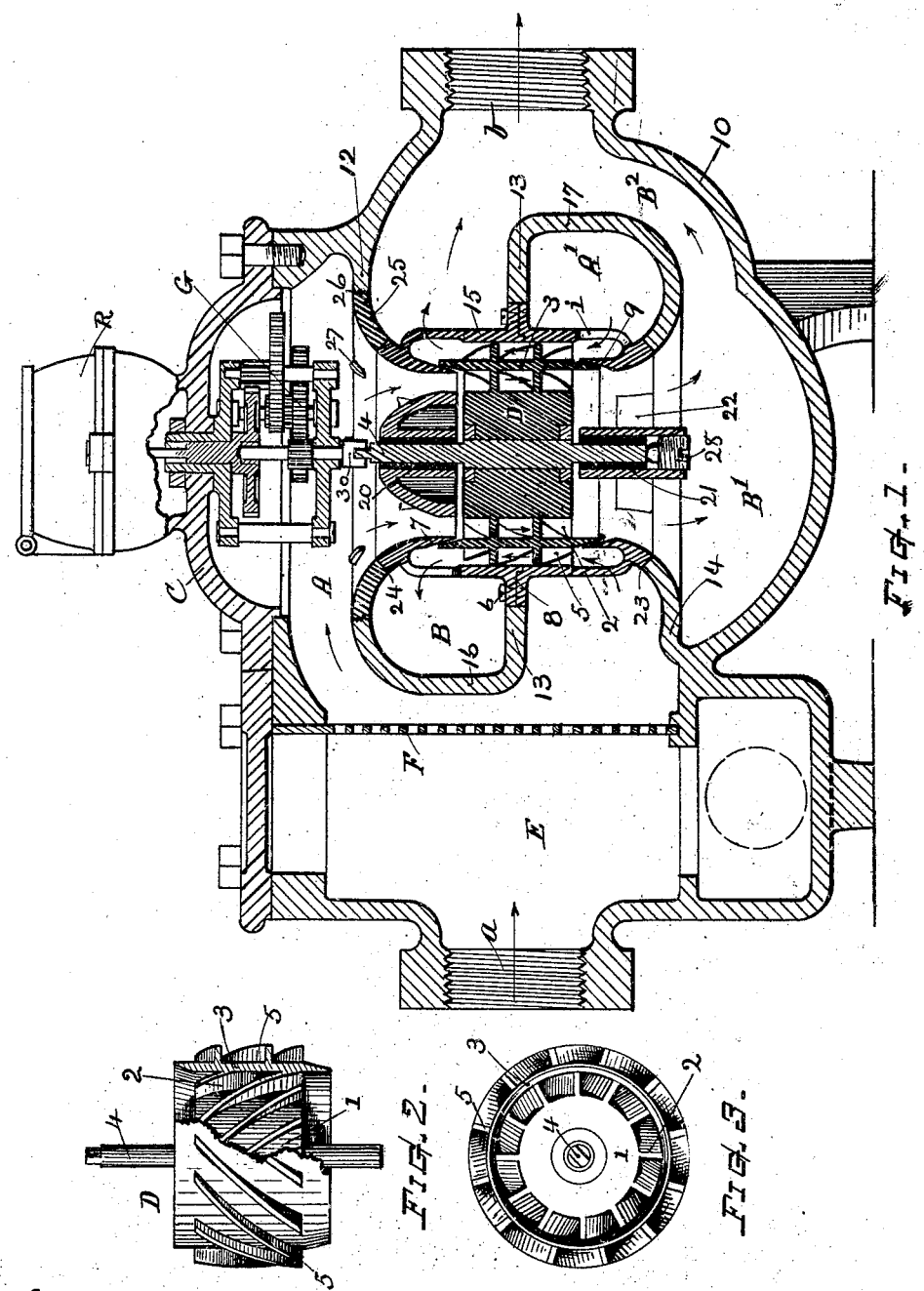
Witnesses
Ella P. Plenus
S. P. Morris
Inventor
Charles F. Merrill
By Chas. H. Burleigh
Attorney No. 869,320. PATENTED OCT. 29, 1907.
C. F. MERRILL.
WATER METER.
APPLICATION FILED MAR. 18, 1907.

3 SHEETS—SHEET 2.

Witnesses.

Inventor.
Charles F. Merrill
By Chas. H. Burleigh
Attorney

No. 869,320.
PATENTED OCT. 29, 1907.
C. F. MERRILL.
WATER METER.
APPLICATION FILED MAR. 18, 1907.
3 SHEETS—SHEET 3.
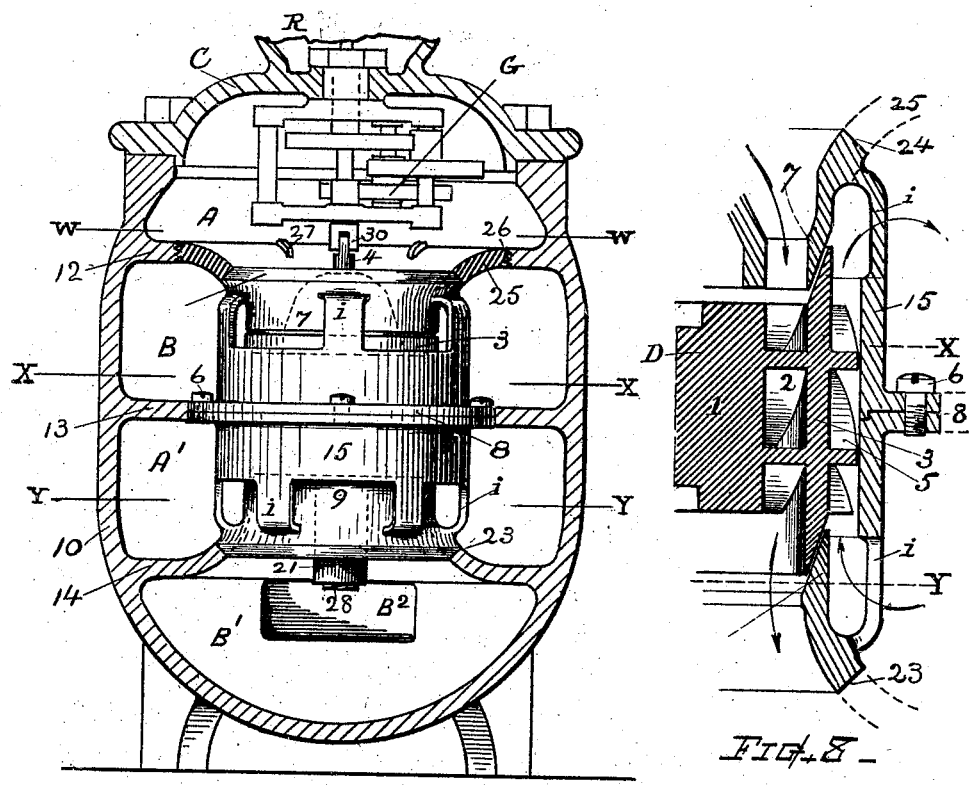
FIG. 7.
FIG. 8.
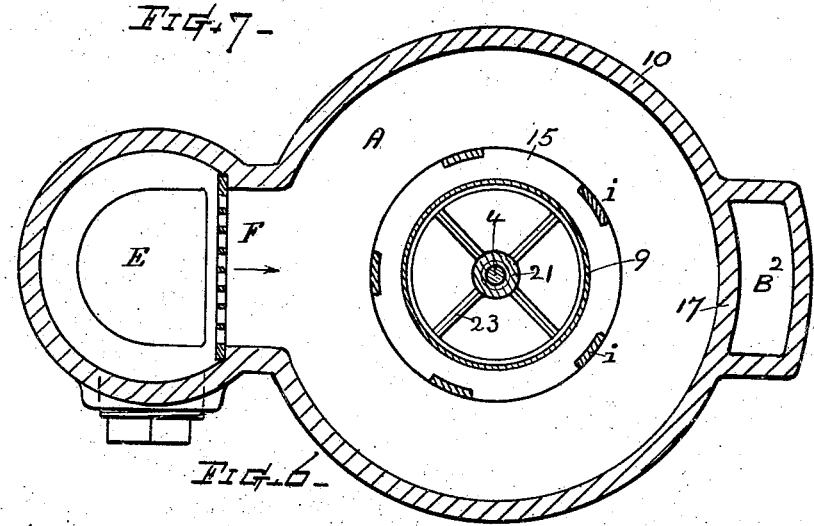
FIG. 6.
Witnesses.
Ella P. Bleaud.
S. R. Morris
Inventor.
Charles F. Merrill
By Chas. H. Burleigh
Attorney

UNITED STATES PATENT OFFICE.

CHARLES F. MERRILL, OF WORCESTER, MASSACHUSETTS, ASSIGNOR TO UNION WATER METER COMPANY, OF WORCESTER, MASSACHUSETTS, A CORPORATION OF MASSACHUSETTS.

WATER-METER.

No. 869,320.　　　　　Specification of Letters Patent.　　　　Patented Oct. 29, 1907.

Application filed March 18, 1907. Serial No. 362,838.

*To all whom it may concern:*

Be it known that I, CHARLES F. MERRILL, a citizen of the United States, residing at Worcester, in the county of Worcester and State of Massachusetts, have invented a new and useful Improvement in Water-Meters, of which the following is a specification, reference being made therein to the accompanying drawings.

My present invention relates to certain novel features of construction in that class of water-meters, or liquid metering mechanism commonly known as "velocity meters" or "current meters"; the prime object of my invention being to provide an efficient, compact and conveniently accessible meter mechanism wherein the whirler or meter-wheel is formed with a plurality of series of helically disposed vanes arranged concentric to each other, and combined with an inner casing or cylinder of such construction that the water currents will simultaneously act on said wheel from opposite directions with propelling power, and will thus tend to balance, modify or partially overcome the thrust or endwise pressure of the whirl, while flowing through the mechanism and imparting movement thereto.

Another object is to provide an interior casing of peculiar construction adapted for delivering oppositely directed currents through the whirler or metering wheel; which casing, together with the wheel-mechanism, can be conveniently bodily removed from and replaced in the main casing without disturbing the wheel-mechanism in respect to said inner casing.

Minor objects and features of my invention will be understood from the following detailed description and claims.

Figure 4:
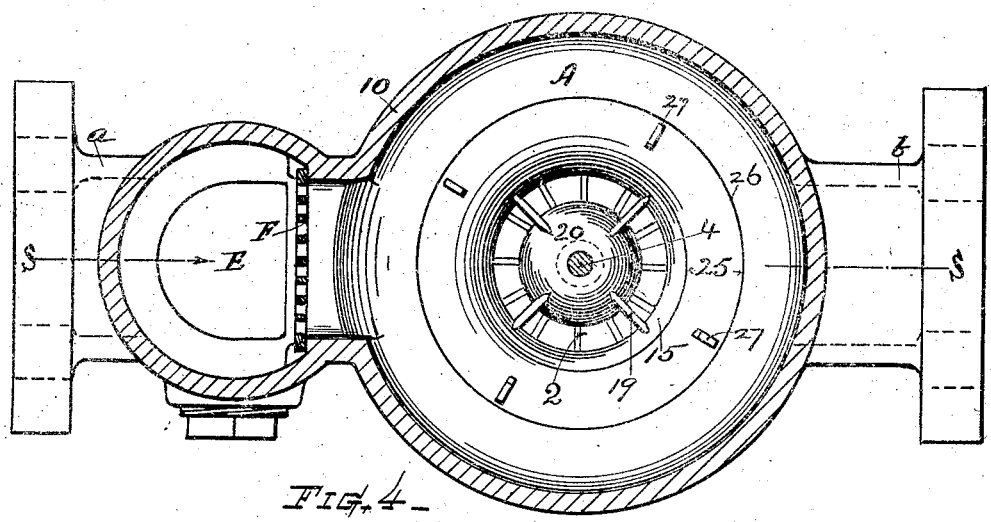
Figure 5:
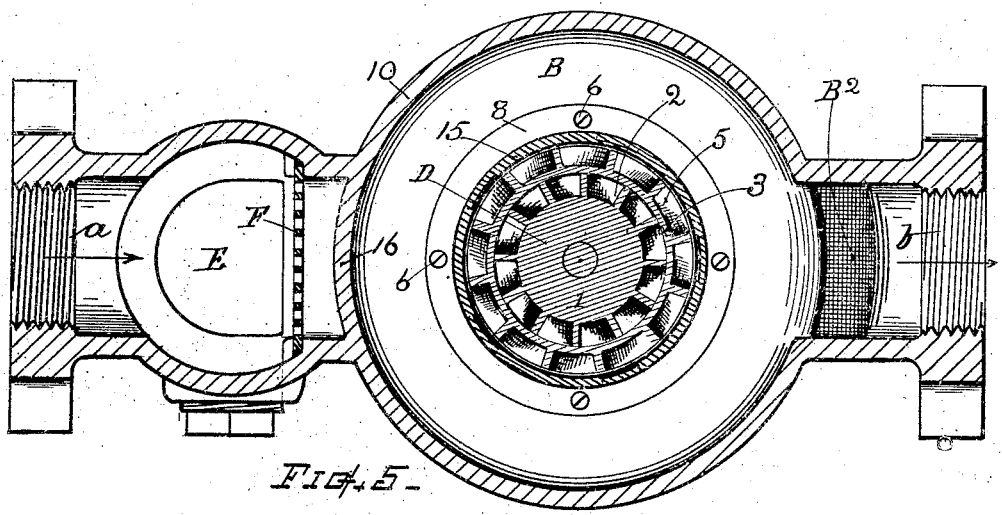

In the accompanying drawings, Figure 1 represents a vertical central section (at line S S Fig. 4) of a water-meter embodying the features of my invention. Fig. 2 represents a separate side view of the improved whirler or meter-wheel; a portion being broken away to reveal internal structure. Fig. 3 is a separate view of the top end of the wheel. Fig. 4 is a horizontal section at the position of line W W on Fig. 7; Fig. 5 a horizontal section at line X X, and Fig. 6 a horizontal section at line Y Y; Fig. 7 a transverse sectional view representing the main casing in vertical section, and showing the exterior of the inner casing or cylinder in front view. Fig. 8 is a fragmentary vertical section through one side of the meter-wheel and cylinder, drawn on somewhat larger scale.

In referring to the drawings the numeral 10 indicates the shell or main casing of the meter provided with the inlet spud $a$ and outlet spud $b$. The top of the casing is provided with a removable cap-plate or cover C upon which is the box R for containing the usual registering mechanism, and the means for supporting the train of reducing gearing G that transmits the power and motion from the meter-wheel spindle to the registering mechanism.

In accordance with my invention the shell or main casing 10 is provided with three internal horizontal partitions extending inward from the shell; an upper partition 12, a central partition 13 and a lower partition 14, each having a suitable opening for accommodating the inner casing or cylinder 15 within which the whirler or meter-wheel D is supported to rotate, in the peculiar manner more fully hereinafter explained. The central horizontal partition 13 is integrally joined with the upper partition 12, on the inlet side, by the upright wall 16; and at the outlet side is joined with the lower horizontal partition 14 by the upright wall 17; thus dividing the interior of the shell or casing in a manner to provide upper and lower inlet chambers or water-ways A and $A^1$, and upper and lower outlet chambers or water-ways B and $B^1$; the lower outlet chamber communicating with the outlet spud through the passage $B^2$. A strainer F and ante-chamber E are preferably arranged within the casing as shown.

The whirler or meter-wheel D comprises two series of helical vanes; the vanes in the separate series being concentrically disposed and formed with the trend of their helical pitch in opposite directions. Said wheel is best made with a metal shaft 4 and a body of hard rubber, or similar material, rigidly secured thereon. The wheel consists of a hub portion 1; an inner series of helical vanes 2; a cylindric barrier 3 surrounding said inner vanes; and an outer series of vanes 5 arranged about the exterior of the barrier which separates the annular series of vanes and intervening water-way spaces, one series from the other. (See Figs. 2 and 3.) The ends of the barrier are best extended above and below the hub and ends of the vanes; and the extended portions are preferably beveled on the inner side at the upper end of the wheel, and at the outer side at the lower end of the wheel, to non-contactingly match and coöperate with the circular directing lips or adjacent portions of the funnel ends of the inner casing; the lips and barrier flanges being lapped by each other, as shown in Figs 1 and 8.

The vanes in the respective series may, for ordinary service, be of the same helical pitch; but for instances where there is wide variation in the quantity of flowage through the meters, I prefer to make the helical vanes in the respective series of different pitch, as such difference serves to overcome the tendency of the metering-wheel to gain, or measure in excess, when acting under a flow of high velocity.

The wheel-casing cylinder 15 is preferably formed in two parts, fitting together with an annular joint or flange 8 at the center of its length, and secured by screws 6. The ends of the inner casing are best made somewhat flaring or funnel shaped, with inwardly extending circular lips 7 and 9 that respectively adjacently match with the projecting ends of the meter-wheel, in the manner shown in Figs. 1 and 8. The body or central part of the inner-casing 15 is formed as a plain cylinder or tube surrounding the outer series of vanes 5 at a close running fit. The upper and lower portions of this cylinder casing connect with the funnel ends, or lipped portions 7 and 9, by braces or bars $i$ having ample passages for water between the several bars. The water or liquid from the chamber $A^1$ can flow into contact with the outer series of vanes 5, when it passes to the chamber B; while the open ends of the cylinder afford passage for the water through the inner series of vanes 2 on its way from the upper chamber A to the lower chamber $B^1$. The water flows in the direction indicated by the arrows on Fig. 1.

Bearing sleeves or boxes 20 and 21 for the upper and lower ends of the meter-wheel shaft 4 are formed integral with the cylinder sections, and are joined thereto by flat radial arms 19 and 22 that extend across the water-way. These arms serve as directing guides for the liquid, as it passes from and to the wheel, so that the main current will flow in an approximately direct course and exert its force on the vanes for revolving the whirler or meter-wheel D with a speed proportionate to the velocity of the flowing current.

The flange joint 8 at the center of the inner case cylinder is made to externally fit the opening in the central partition 13. The lower and upper ends of said cylinder are formed with joint surfaces at 23 and 24 to match the partitions; preferably a conoidally beveled edge or joint, as shown. A ring or annulus 25, threaded at its periphery 26, is fitted into the opening in the upper partition 12, matching the joint surface 24 at the upper end of the cylinder, so that when screwed into the opening said annulus holds the inner casing or cylinder securely in place within the main casing. Said annulus is best provided with lugs or means 27 to facilitate turning it when screwing it into and from position. If in any instance desired, other means may be employed in lieu of the threaded peripheral edge 26 for securing the annulus and inner casing in position. The upper bearing sleeve 20 is rounded at its top as shown, so as to guard the end of the wheel-hub and form an easy directing course for the water into the inner series of vanes 2.

The lower end of the wheel spindle rests on an adjustable step bearing 28, and its upper end is connected with the main shaft of the reducing gear by an interlocking joint 30 which permits of the cap and gearing being readily removed and replaced without disturbing the wheel and inner casing. When desired the inner casing can be removed from the main casing without disturbing the wheel within said casing, by simply unscrewing the annulus 25; and when said annulus is removed the cylinder and wheel mechanism can be lifted out and replaced without inconvenience.

In the operation, the water from chamber A flows down through the wheel to the chamber $B^1$, acting on the inner series of vanes. At the same time another portion of current flows from the chamber $A^1$ up through the cylinder 15 outside of the barrier to the chamber B, acting upon the outer series of vanes. Thus the upward flow acting on the outer series tends to lift the wheel and to counteract or overcome the pressure of the downward flow, acting on the inner series of vanes.

The two series of vanes can be made in proper proportion so that the wheel, when in action, is practically balanced by the force of the water; thereby taking nearly the entire weight of the wheel off from the step-bearing, rendering the operation free and easy, and avoiding excessive wear upon the parts.

I am aware that a water-meter has been heretofore patented in which two wheels separately supported upon a single shaft are shown; the flow of water for the respective wheels being from opposite ends of the wheel-inclosing casing to a central chamber. I am also aware that helical-vaned wheels are common in meters. It will therefore be understood that I do not broadly claim such prior constructive features as of my invention.

What I claim is—

1. In a water-meter of the class described, the combination of a main meter-casing or shell provided with inlet and outlet spuds, and having internally the upper, middle and lower horizontal partitions, said upper and middle partitions united by an integral wall across the inlet side, and said lower and middle partitions united by a wall across the outlet side, an inner-casing fitted within openings in the several partitions, a meter-wheel provided with a plurality of concentrically arranged annular series of helical vanes, the vanes of the respective series disposed with opposite inclination, and having a separating barrier between the series, the mid-portions of said inner-casing surrounding the outer series of vanes, its end sections forming directing funnels in alinement with said barrier, bearings for supporting the meter-wheel axle within said funnels, and means for securing said inner casing within the main casing.

2. In a water-meter of the class described, a meter-casing having inlet and outlet spuds, and provided with internal partitions separating the interior into two inflow-chambers and two outflow-chambers, a meter-wheel comprising two separated concentric series of helical vanes, said vanes oppositely inclined in the respective series, an inner casing arranged through the several partitions and surrounding the periphery of said wheel, and having end-sections that coincide with the dividing barrier between the series of vanes, bearings for said meter-wheel, and water-ways in said inner-casing for simultaneously delivering currents from the respective inflow-chambers through said meter-wheel in opposite directions.

3. In a water-meter of the class described, a meter-wheel comprising an axis spindle and a wheel-body mounted thereon having two differently diametered series of inclined vanes and water-ways concentrically disposed one series within the circle of the other about said body; the vanes of the two series terminating in approximately the same plane at the ends of the body, in combination with means for directing portions of the metered current through the respective series, simultaneously, from end to end of the body.

4. In a current water-meter of the class described, a meter-wheel comprising a body or hub provided with a plurality of series of helically-disposed vanes arranged concentrically about said body, and having the vanes of the separate series formed with different helical pitch, for the purpose set forth.

5. In a water-meter of the class described, a meter-wheel comprising an outer series and an inner series of helical vanes, and having a cylindric barrier between the two series of vanes separating the annular spaces occupied by the respective series.

6. In a water-meter of the class described, a meter-wheel comprising an axis-spindle, a hub thereon with two oppositely directed, concentrically arranged series of helical vanes, and a concentric cylindric wall or barrier separating the two series of vanes, the ends of said barrier extending as a circular flange beyond the ends of the hub and vanes.

7. In a water-meter of the class described, a meter-wheel comprising two concentric series of helical vanes separated by a barrier or partition between the series, the helical trend of the vanes being in opposite direction and of different pitch in the respective series; in combination with means for directing two currents of water through the wheel to impinge in opposite directions upon the vanes of the respective series.

8. In a water-meter of the class described, the combination of a meter-wheel provided with cylindrical end flanges; in combination with a wheel-casing provided with inwardly directed end sections having lips that coact with said flanges for dividing the currents, the adjacent edges of said lips and flanges being beveled and non-contactingly lapped by each other, substantially as set forth.

9. In a water-meter of the class described, a meter-wheel comprising an axis-spindle, a body-hub carrying two oppositely directed concentrically arranged series of helically disposed vanes, a cylindric barrier separating said series of vanes and projecting beyond the ends of the body-hub, a wheel-casing comprising a cylindrical mid-section surrounding the outer series of vanes, and upper and lower end-sections with circular lips that adjacently match without contact, the ends of said barrier, means connecting the mid-section and end-sections, and having openings or water-ways between said connecting means, and annular spaces between the sections, and journal-bearings for the axis-spindle concentric with said end-sections.

10. In a water-meter of the character described, in combination with the meter-wheel having an axis-spindle, and peripheral series of vanes; a wheel-casing cylinder formed in two parts with an annular connecting joint intermedial in its length, a funnel-shaped end-section on each part having a circular inward lip, a concentric bearing-sleeve at each end for supporting the axis-spindle, and radial arms connecting said bearing-sleeve with the funnel section and serving as directing guides for the current.

11. In a water-meter of the class described, the inner or wheel-casing made in two parts detachably united by a countermatching joint midway of its length, each part provided with a concentrically disposed bearing-sleeve integrally connected therewith, the end portions of said casing comprising inwardly arranged lips for separating and directing the water currents; in combination with a meter-wheel having two series of vanes, and an axis-spindle with projecting journals that are respectively mounted in said bearing sleeves.

12. In a water-meter of the class described, the combination with the meter-wheel, and the main meter-casing provided with internal partitions as specified, of the inner-casing provided with joint-surfaces at its respective ends, and an intermediate joint-surface, for matching with the several partitions, and the securing annulus for retaining said inner casing within the main meter-casing, substantially as set forth.

13. In a water-meter of the class described, the combination with the meter-wheel having the series of helical vanes, and the main meter-casing having internal horizontal partitions arranged therein substantially as shown; of the inner or wheel-casing provided with a circumferential joint-flange, and having conoidally beveled ends, a seat within the main casing matching the lower end of said inner casing, and an inwardly rounded annulus having an inner edge-surface fitted to match against the upper end of the inner-casing, and an outer-edge threaded into the upper partition within the meter-casing for securing the inner casing in position.

Witness my hand this 14th day of March, 1907.

CHARLES F. MERRILL.

Witnesses:
CHAS. H. BURLEIGH,
ELLA P. BLENUS.